July 16, 1929.  E. JACOB  1,721,303
METHOD OF REMOVING THE SPRUES FROM CUTTING TOOLS AND SIMILAR OBJECTS
Filed April 16, 1928
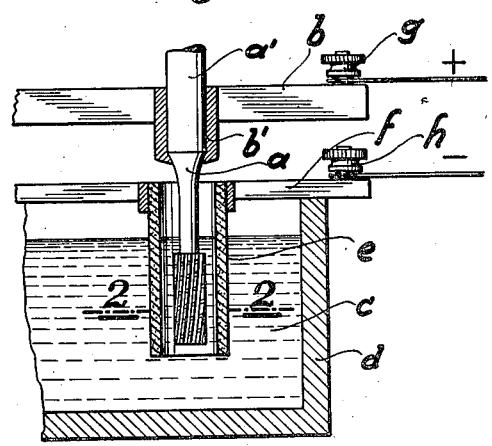
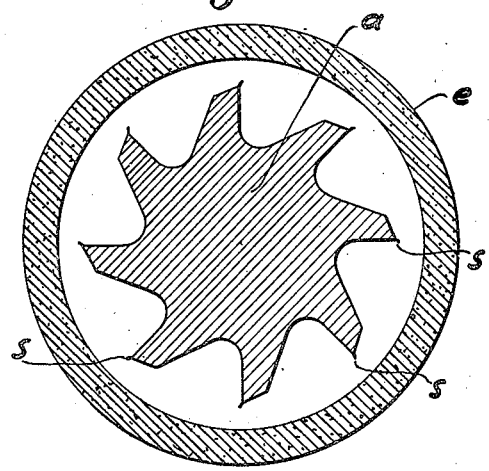
INVENTOR.
Ernst Jacob
BY
ATTORNEY.

Patented July 16, 1929.

1,721,303

UNITED STATES PATENT OFFICE.

ERNST JACOB, OF DUSSELDORF, GERMANY.

METHOD OF REMOVING THE SPRUES FROM CUTTING TOOLS AND SIMILAR OBJECTS.

Application filed April 16, 1928, Serial No. 270,391, and in Germany December 20, 1926.

This invention has reference to a method of removing the sprue or fin on cutting edges of tools and the like particularly the rather delicate sprue occurring on the cutting edges of fine cutting tools in the grinding and machining of the same and which it was difficult heretofore to remove by the means employed in the previous art. Among other uses the invention is particularly adapted for operation in the case of the boring, milling and machining tools employed for dental and similar purposes, which are manufactured nowadays in large quantities mostly by milling or similar operation because the subsequent grinding of the teeth would be too expensive. With this kind of manufacture the milling sprue cannot be avoided which will differ in accordance with the sharpness of the milling tool employed, its rate of feed, the velocity of the cut and the angle of the cutting edges. In accordance with the previous art the sprue or fin was mostly removed by a brushing operation, but very often the sprue is situated at the cutting edge itself, so that its removal presents great difficulties. Other suggestions such as for instance, the use of a grinding powder or the like result in considerable injury to the cutting edge, and it is likewise impossible to entirely remove the sprue by a subsequent grinding or trimming operation in view of the fact that a new sprue will, of course, be produced in this finishing operation likewise.

Now, my invention is intended to do away with these difficulties by making use of electro-chemical means which result in the complete removal of the sprue or fin in a minimum of time, so as to considerably increase the grinding capacity and the life of such tools, the difficulty referred to being the more objectionable, since the sprue became attached to the pieces of work and was rubbingly engaged with the sharp cutting edges so as to injure them and to wear them out in a very short time. This is one of the most urgent reasons of the necessity of removing the sprue aside from the unfavorable appearance of a cutting tool carrying such sprues or fins. With the new process according to my invention there is moreover the additional advantage of a considerable saving of time and expenses because the new process may be carried out simultaneously with the hardening of the cutting tools.

The new process as above-mentioned makes use of electro-chemical means. While I am aware of the use of the electric current for the sharpening of tools and the revival of worn out engravings by electrolytic means which produce a rather irregular action upon the tools or engravings in accordance with their distances from the electric terminals, my invention does not refer to the sharpening of the cutting edges itself but it makes use of an electrolytic bath for the removal of the fine fins or sprues which it was impossible to remove heretofore in a satisfactory manner. Broadly considered, the process according to my invention is carried out by immersing the cutting tool from which the sprue is to be removed, into a bath through which an electric current is caused to pass, the object to be treated constituting the anode. The direct current passing through the liquid will remove the sprue at the cutting edges within a few seconds and will deposit the metal thereof at the cathode. In this operation which requires altogether only about twenty seconds, there is no liability of any injury of the cutting edges because these edges are protected against the action of the electrolyte by the sprue, until the latter has become completely dissolved. It is therefore sufficient to determine the proper strength of current and the proper time for its passage by preliminary tests, in order to avoid all possibilities of injury to the cutting edges themselves after the sprue has been removed.

On the accompanying drawing I have shown by way of example a form of construction of a device which may be used as an instance for the carrying out of my invention. Fig. 1 is a vertical fragmentary longitudinal section through a device of this kind and Fig. 2 is a horizontal section on a considerably enlarged scale taken through the cutting tool and the cathode on the line 2—2 of Fig. 1.

As appears from the drawing, the cutting tool $a$ is immersed or suspended in a liquid $c$ contained in the vessel $d$ and conducting the electric current, the object being arranged at the interior of the hollow cylindrical cathode $e$. With its stem or handle $a^1$ the tool is secured to a sleeve $d^1$ mounted in the plate $b$ while the cathode $e$ is engaged with the plate $f$ by the terminal $d$. The electric current is admitted to the plate $b$ and thence to the tool $a$, the electric current then passing from the tool through the sprues on the ends $s$ of its teeth into the liquid and thence passing to the cathode $e$ and leaving the liquid through the plate $f$ at the terminal $h$. By the action of the electric current the sprue particles are eaten away from the pointed ends of the cutting edges, and, after the sprues are entirely removed, which will take a few seconds only, the tool is withdrawn and a new tool is introduced in its place. Instead of the hollow cylindrical cathode I may also make use of a plate-like or otherwise shaped cathode which is electrically connected to the terminal $h$.

The process according to this invention may also be carried out in such a manner that the liquid electrolyte consists of a liquefied bath of so-called hardening salts, such as for instance chloride of barium or chloride of potassium or similar salts which have been raised to red heat by the heating of the container $d$. The direct current is admitted in the same manner as hereinbefore described, but the cathode is constituted by the vessel $d$ which represents the crucible for containing and heating the bath of salts and to which the negative terminal $h$ may be directly connected. Instead of this arrangement a suitable body immersed in the bath of salts may serve as a cathode. The tool, when treated in this manner, is free from the sprue or fin and at the same time is heated to the temperature necessary for the hardening operation, the process being carried out in such a manner that the removal of the sprue which requires less time has to be terminated at the proper moment by interrupting the current flow. It will be understood, of course, that hardening of the tool, after removal of its sprues, is completed by quenching it in a cool or cold water, oil or other suitable bath, or by equivalent treatment.

It will have to be understood that the invention as hereinbefore set forth is described in its broad aspects only and by way of illustration without limiting it to the particular details set forth and it may be modified within the spirit and scope of the appended claims.

I claim:—

1. The method of removing the sprues from the cutting edges of tools and from similar objects and hardening the same, which consists in heating an electrolytic bath of hardening salts to red heat, immersing the tool in the red hot bath and employing the same as an anode in conjunction with a suitable cathode, passing an electric current through the bath and between the said electrodes until the sprues are removed from the tool, interrupting the current after the tool is heated to a suitable degree for hardening it, and then removing the tool from the heated bath and subjecting it to quenching treatment.

2. The method of removing the sprues from the cutting edges of tools and from similar objects and hardening the same, which consists in heating an electrolytic bath composed of hardening metal chlorides to red heat, immersing the object in the red hot bath and utilizing the same as an anode in conjunction with a suitable cathode, passing the current through the bath and between the said electrodes until the sprues have been removed from the tool, interrupting the current after the tool is heated to a suitable degree for hardening it, and then removing the tool from the heated bath and subjecting it to quenching treatment.

In testimony whereof I affix my signature.

ERNST JACOB.